(12) United States Patent
Matsumoto et al.

(10) Patent No.: US 7,456,539 B2
(45) Date of Patent: Nov. 25, 2008

(54) ROTOR AND METHOD OF MANUFACTURING THE SAME

(75) Inventors: Katsunari Matsumoto, Nishikamo-gun (JP); Tatsuhiko Mizutani, Toyota (JP); Toshiya Sugiyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 22 days.

(21) Appl. No.: 11/350,071

(22) Filed: Feb. 9, 2006

(65) Prior Publication Data

US 2006/0186752 A1 Aug. 24, 2006

(30) Foreign Application Priority Data

Feb. 24, 2005 (JP) ............................. 2005-048867

(51) Int. Cl.
*H02K 21/12* (2006.01)

(52) U.S. Cl. ................................. 310/156.21; 310/261

(58) Field of Classification Search ................................
310/156.01–156.84, 261
See application file for complete search history.

(56) References Cited

U.S. PATENT DOCUMENTS

| | | | |
|---|---|---|---|
| 6,353,275 B1 * | 3/2002 | Nishiyama et al. | 310/156.53 |
| 6,437,473 B1 * | 8/2002 | Mobius et al. | 310/156.21 |
| 6,944,929 B2 * | 9/2005 | Ogawa et al. | 29/458 |

FOREIGN PATENT DOCUMENTS

| | | | |
|---|---|---|---|
| FR | 95 08086 | * | 6/1995 |
| FR | 2 736 220 A1 | | 1/1997 |
| JP | A 11-191939 | | 7/1999 |
| JP | A 2002-345189 | | 11/2002 |
| JP | A 2004-080898 | | 3/2004 |
| JP | A 2005-269804 | | 9/2005 |

* cited by examiner

*Primary Examiner*—Nguyen N Hanh
(74) *Attorney, Agent, or Firm*—Oliff & Berridge, PLC

(57) ABSTRACT

A rotor includes a rotor core fixedly provided on a shaft and having a hole, a magnet inserted into the hole, and a resin portion injected between the side surface of the hole and the side surface of the magnet and, the side surface of the magnet has a groove formed therein as a spread-promoting portion that promotes spread of the injected resin portion.

7 Claims, 12 Drawing Sheets

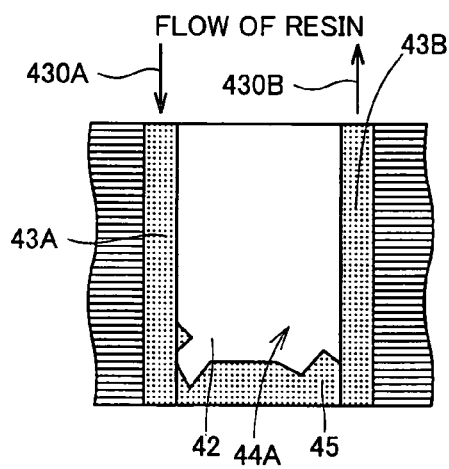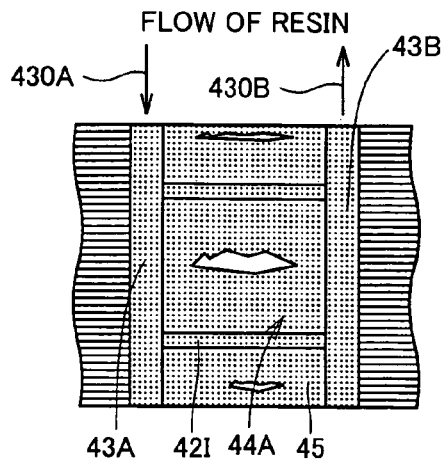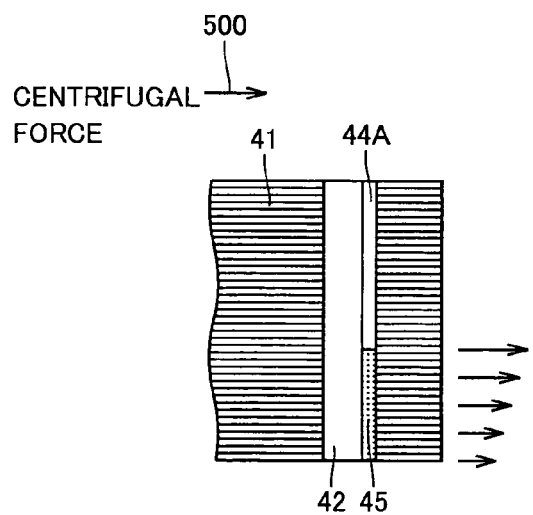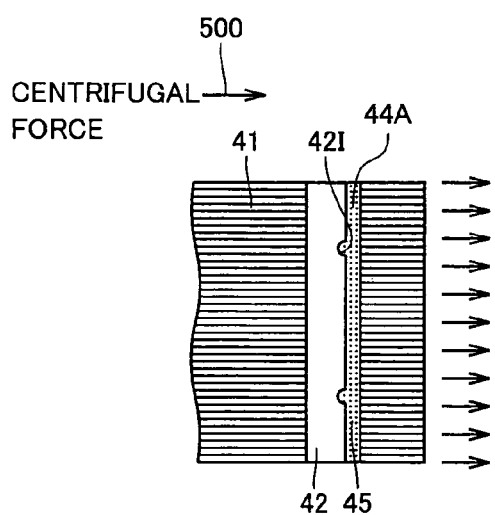

ROTOR AND METHOD OF MANUFACTURING THE SAME

This nonprovisional application is based on Japanese Patent Application No. 2005-048867 filed with the Japan Patent Office on Feb. 24, 2005, the entire contents of which are hereby incorporated by reference.

BACKGROUND OF THE INVENTION

1. Field of the Invention

The present invention relates to a rotor and a method of manufacturing the rotor. In particular, the invention relates to a rotor having a magnet attached thereto and a method of manufacturing the rotor.

2. Description of the Background Art

A rotor having a magnet attached thereto has been known.

For example, Japanese Patent Laying-Open No. 11-191939 discloses that a groove is provided in the wall surface of a permanent-magnet-embedded hole provided in a rotor core and an adhesive layer for fixing the rotor core and the magnet to each other is provided in the groove.

Further, Japanese Patent Laying-Open No. 2002-345189 discloses that a slit for increasing the resistance is provided in a magnet piece and near the outer periphery of a rotor so as to prevent eddy current from being generated.

Furthermore, Japanese Patent Laying-Open No. 2004-080898 discloses that a gap between an adhesion surface of a magnet and an adhesion surface of a yoke is tapered.

It is desired that a magnet embedded in a rotor core presses the rotor core with a uniform force. Therefore, what is important here is that a gap between the magnet and the wall surface of a hole in which the magnet is embedded is uniformly filled with a filler serving as an adhesive layer.

Japanese Patent Laying-Open No. 11-191939, however, is based on the condition that the inside of the groove formed in the rotor is uniformly filled with the adhesive layer, and thus discloses nothing about how to address the state where the filler serving as the adhesive layer does not appropriately and sufficiently spread in the groove.

In addition, Japanese Patent Laying-Open No. 2002-345189 discloses no component for promoting spread of the filler. Moreover, Japanese Patent Laying-Open No. 2004-080898 does not disclose the idea that a component for promoting spread of the filler is provided in the magnet or the rotor core in which the magnet is embedded.

SUMMARY OF THE INVENTION

An object of the present invention is to provide a rotor having a filler that uniformly fills the gap between a magnet and the wall surface of a hole in which the magnet is embedded as well as a method of manufacturing the rotor.

According to the present invention, a rotor includes: a rotor core fixedly provided on a rotational shaft and having a hole; a magnet inserted into the hole; and a filling portion injected into a gap between a side surface of the hole and a side surface of the magnet. At least one of the magnet and the rotor core has a spread-promoting portion formed therein for promoting spread of the filling portion injected into the gap.

With the above-described structure, the spread of a filler into the gap between the magnet and the rotor core is facilitated. Thus, the force transmitted from the magnet to the rotor core can uniformly be distributed. Accordingly, deterioration in strength of the rotor core can be prevented.

Preferably, regarding the above-described rotor, the spread-promoting portion promotes the spread of the filling portion on a side of the magnet that is located on the radially outer side of the rotor core.

While the rotor core is rotating, centrifugal force is exerted on the magnet. By promoting the spread of the filling portion on the side of the magnet that is located on the radially outer side of the rotor core, the centrifugal force transmitted from the magnet to the rotor core can uniformly be distributed.

Preferably, regarding the above-described rotor, on a cross section with respect to the axial direction, the dimension in a first direction of the hole and the magnet each is relatively small and the dimension in a second direction thereof that is orthogonal to the first direction is relatively large, and the spread-promoting portion is formed to extend in the second direction.

Thus, the effect of promoting the spread of the filler can be obtained in the region where the dimension is relatively large. In other words, the effect of promoting the spread can more effectively be obtained.

Preferably, regarding the above-described rotor, the gap between the side surface of the hole and the side surface of the magnet includes a first portion with a relatively large width and a second portion with a relatively small width and, in a portion of the magnet or the rotor core that faces the second portion, the spread-promoting portion is provided.

In the second portion of the gap that has a relatively small width, the spread of the filler is likely to be limited. By providing the spread-promoting portion in this second portion, the spread of the filler can more effectively be promoted.

Preferably, regarding the above-described rotor, the spread-promoting portion includes at least one of a groove, a chamfered portion and a recessed portion formed in the magnet or the rotor core.

Accordingly, with the simple structure, the spread of the filler can be promoted.

According to the present invention, a method of manufacturing a rotor includes the steps of inserting a magnet into a hole formed in a rotor core, and pressing the magnet inserted into the hole radially inwardly or radially outwardly of the rotor core and thereafter injecting a filler into a gap between the magnet and a wall surface of the hole.

By pressing the magnet inserted into the hole radially inwardly (outwardly) of the rotor core, the width of the gap between the radially outer surface (radially inner surface) of the magnet and the inner peripheral surface of the hole can be increased to promote the spread of the filler in the width-increased region of the gap. Accordingly, deterioration in strength of the rotor core can be prevented.

As discussed above, in accordance with the present invention, the gap between the magnet and the wall surface of the hole in which the magnet is embedded can uniformly be filled with the filler. Accordingly, the force that is exerted by the magnet embedded in the rotor core and that presses the rotor core can be made uniform.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6A shows the cross section along VIA-VIA in FIG. 5 and FIG. 6B shows the cross section along VIB-VIB in FIG. 5.

FIGS. 7A and 7B illustrate the state where a resin spreads on the radially outer side of the magnet, FIG. 7A illustrates the one regarding a rotor in a reference example and FIG. 7B shows the one regarding the rotor in the first embodiment of the present invention.

FIGS. 8A and 8B illustrate the force that is exerted by the resin on the radially outer surface of the magnet and that presses electromagnetic plates, FIG. 8A shows the one regarding the rotor in the reference example and FIG. 8B shows the one in the first embodiment of the present invention.

FIG. 16A is a plan view and FIG. 16B is a longitudinal cross-sectional view.

DESCRIPTION OF THE PREFERRED EMBODIMENTS

Figure 1:
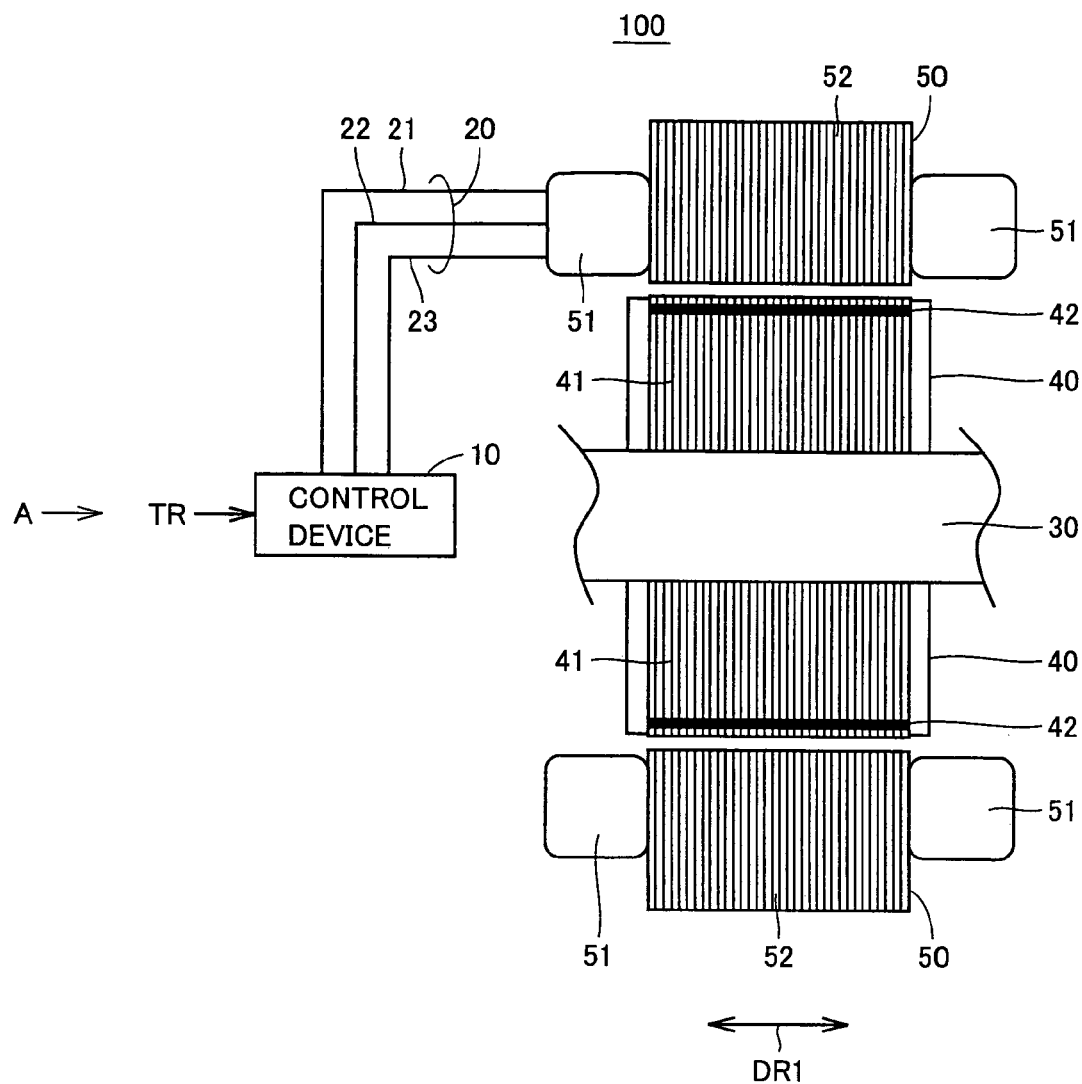
FIG. 1 is a cross-sectional view showing an example of a rotating electric machine having a rotor according to a first embodiment of the present invention.

Embodiments of a rotor and a method of manufacturing the rotor are hereinafter described according to the present invention. Here, like components are denoted by like reference characters and a description thereof may not be repeated in some cases.

First Embodiment

FIG. 1 is a cross-sectional view showing an example of a rotating electric machine having a rotor according to a first embodiment of the present invention. Referring to FIG. 1, rotating electric machine 100 includes a control device 10, a three-phase cable 20, a shaft 30, a rotor 40 and a stator 50.

Rotor 40 includes a rotor core 41 and a permanent magnet 42. Stator 50 includes a stator coil 51 and a stator core 52.

Control device 10 receives, from an ECU (Electrical Control Unit) provided on the outside of rotating electric machine 100, a torque command value TR to be output by rotating electric machine 100, generates motor control current MCTLI for outputting the torque designated by the received torque command value TR, and supplies the generated motor control curent MCTLI through three-phase cable 20 to stator coil 51 of stator 50.

Three-phase cable 20 connects control device 10 and stator coil 51 to each other. Three-phase cable 20 is comprised of a U-phase cable 21, a V-phase cable 22 and a W-phase cable 23. Shaft 30 is inserted in the direction of the rotational axis (hereinafter "rotational-axis direction") DR1 into rotor core 41 of rotor 40 and coupled to rotor core 41. Rotor core 41 is structured by stacking a plurality of electromagnetic plates on each other in the rotational-axis direction DR1. Magnet 42 is inserted in the rotational-axis direction DR1 to rotor core 41.

Stator core 52 of stator 50 is structured by stacking a plurality of electromagnetic plates on each other in the rotational-axis direction DR1. Stator coil 51 is wound around stator core 52. Stator coil 51 is comprised of a U-phase coil, a V-phase coil and a W-phase coil and respective terminals of the three coils are connected to three-phase cable 20.

Figure 2:
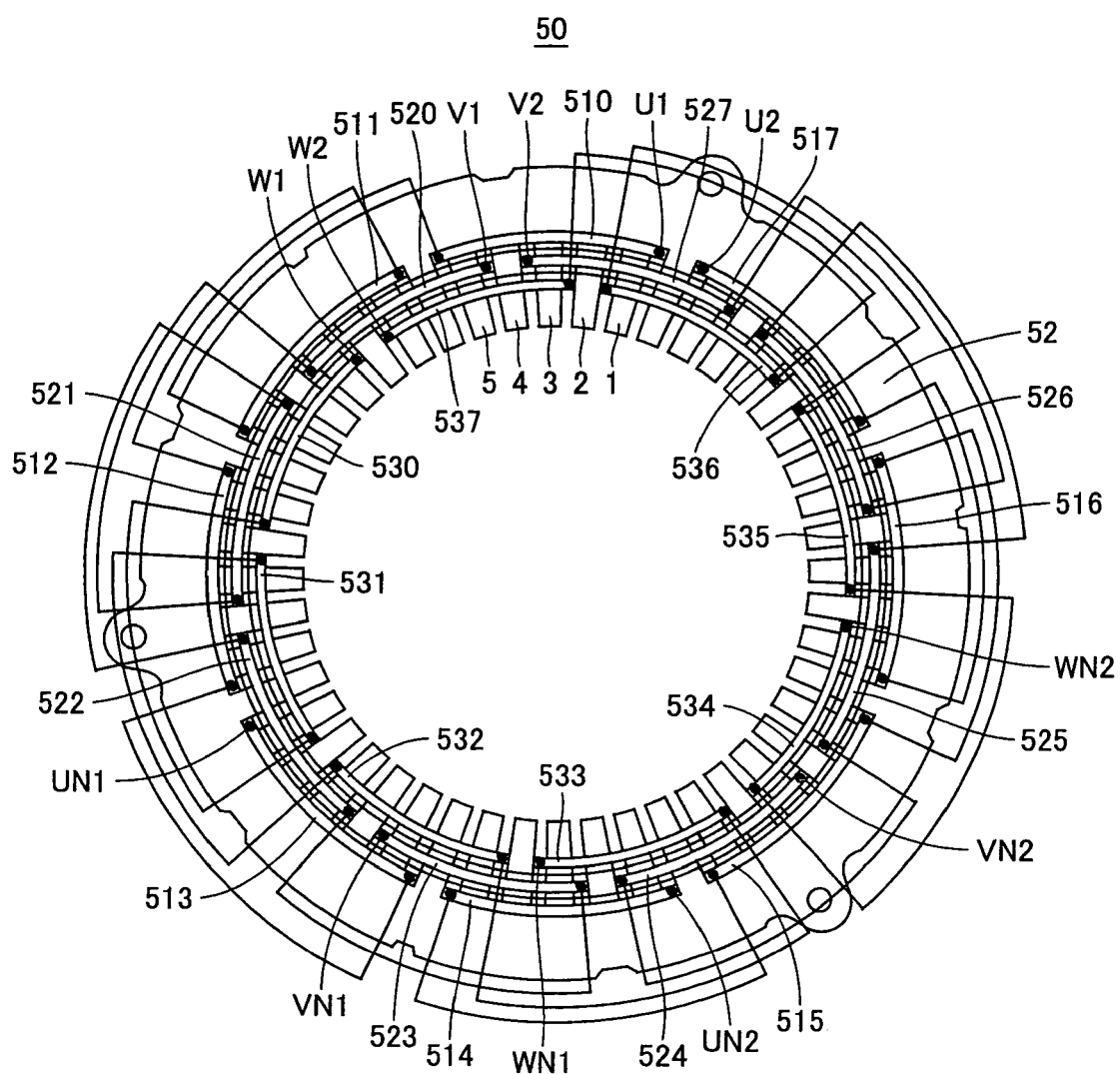
FIG. 2 is a plan view of a stator viewed in the direction A shown in FIG. 1.

FIG. 2 is a plan view of stator 50 viewed in the direction A shown in FIG. 1. Referring to FIG. 2, stator core 52 is in the shape of a hollow cylinder and has 48 teeth 1 arranged on its internal surface in the circumferential direction. The U-phase coil is comprised of coils 510 to 517, the V-phase coil is comprised of coils 520 to 527 and the W-phase coil is comprised of coils 530 to 537. Each of coils 510 to 517, 520 to 527 and 530 to 537 is substantially in the shape of a circular arc. Coils 510 to 517 are arranged as radially outermost coils. Coils 520 to 527 are arranged on the inside of coils 510 to 517 and at a certain distance in the circumferential direction with respect to coils 510 to 517. Coils 530 to 537 are arranged on the inside of coils 520 to 527 and at a certain distance in the circumferential direction with respect to coils 520 to 527.

Coils 510 to 517, 520 to 527 and 530 to 537 are each wound around a corresponding number of teeth. For example, coil 510 corresponds to teeth 1 to 5. Coil 510 is formed by being wound around the whole of teeth 1 to 5 with a predetermined number of turns.

Coils 511 to 517, 520 to 527 and 530 to 537 are also wound around respective corresponding teeth and formed in a similar manner to that for coil 510.

Coils 510 to 513 are connected in series and have one end that is a terminal U1 and the other end that is a neutral point UN1. Coils 514 to 517 are connected in series and have one end that is a terminal U2 and the other end that is a neutral point UN2.

Coils 520 to 523 are connected in series and have one end that is a terminal V1 and the other end that is a neutral point VN1. Coils 524 to 527 are connected in series and have one end that is a terminal V2 and the other end that is a neutral point VN2.

Coils 530 to 533 are connected in series and have one end that is a terminal W1 and the other end that is a neutral point WN1. Coils 534 to 537 are connected in series and have one end that is a terminal W2 and the other end that is a neutral point WN2.

Neutral points UN1, UN2, VN1, VN2, WN1 and WN2 are commonly connected to one point, terminals U1 and U2 are connected to U-phase cable 21 of three-phase cable 20, terminals V1 and V2 are connected to V-phase cable 22 and terminals W1 and W2 are connected to W-phase cable 23.

Figure 3:
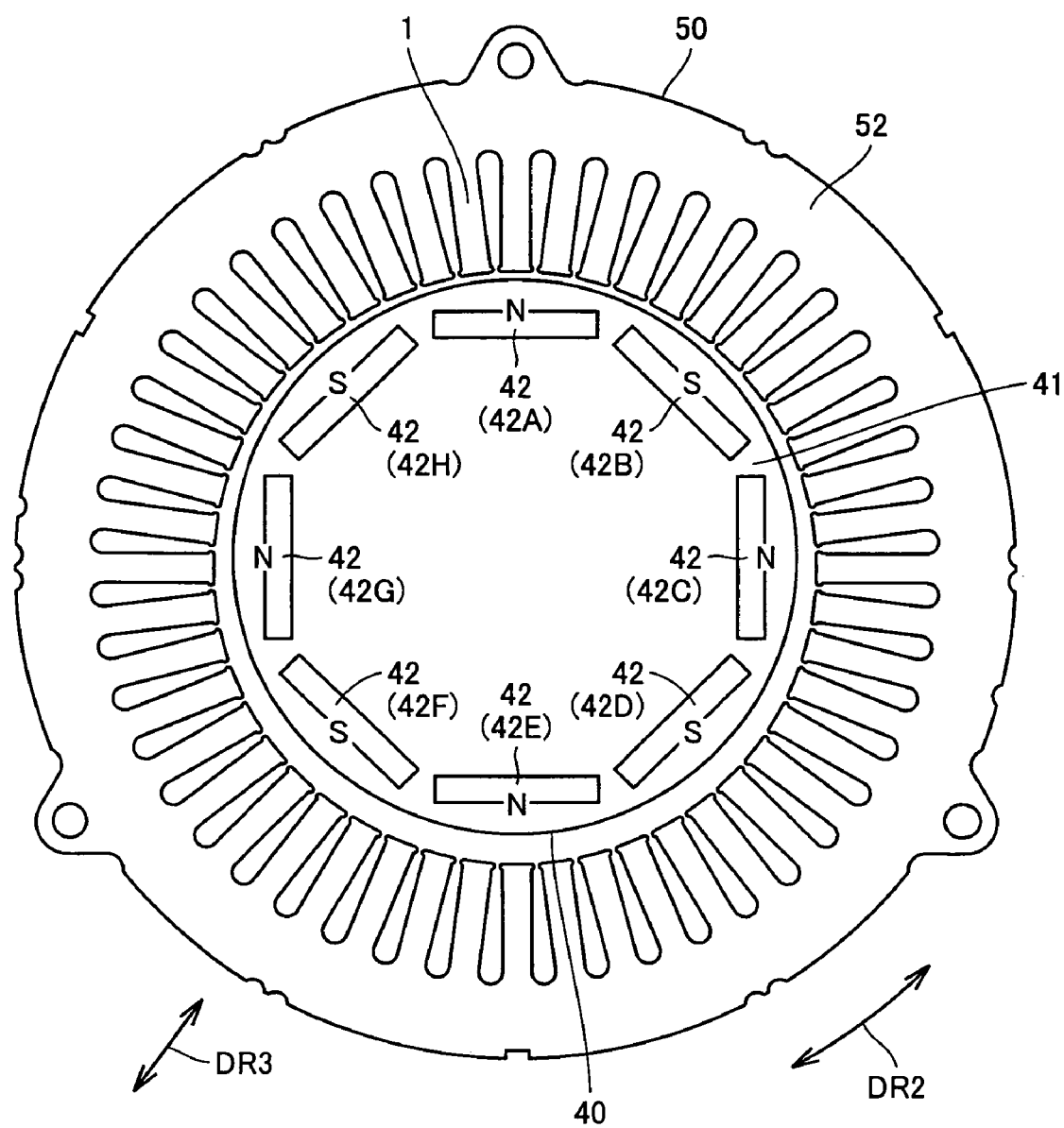
FIG. 3 is a plan view of the rotor and the stator viewed in the direction A shown in FIG. 1.

FIG. 3 is a plan view of rotor 40 and stator 50 viewed in the direction A shown in FIG. 1. Referring to FIG. 3, rotor 40 is provided on the radially inside of stator 50. Eight permanent magnets 42 are arranged in the circumferential direction DR2. Permanent magnets 42A, 42C, 42E and 42G are arranged with respective N poles on the radially outer side of rotor core 41, and permanent magnets 42B, 42D, 42F and 42H are arranged with respective S poles on the radially outer side of rotor core 41. Thus, the eight permanent magnets 42 are arranged in the circumferential direction DR2 in the state where the magnets are polarized in the radial direction DR3 of rotor 40 and magnets adjacent to each other have respective polarities opposite to each other. Coils 510 to 517, 520 to 527 and 530 to 537 are arranged opposite to the eight permanent magnets 42 (42A to 42H).

Stator core 52 includes 48 teeth. The number of the teeth, 48, is determined by multiplying the number of permanent magnets 42 (42A to 42H) included in rotor 40 by six (the number of teeth is an integral multiple of the number of permanent magnets).

Figure 4:
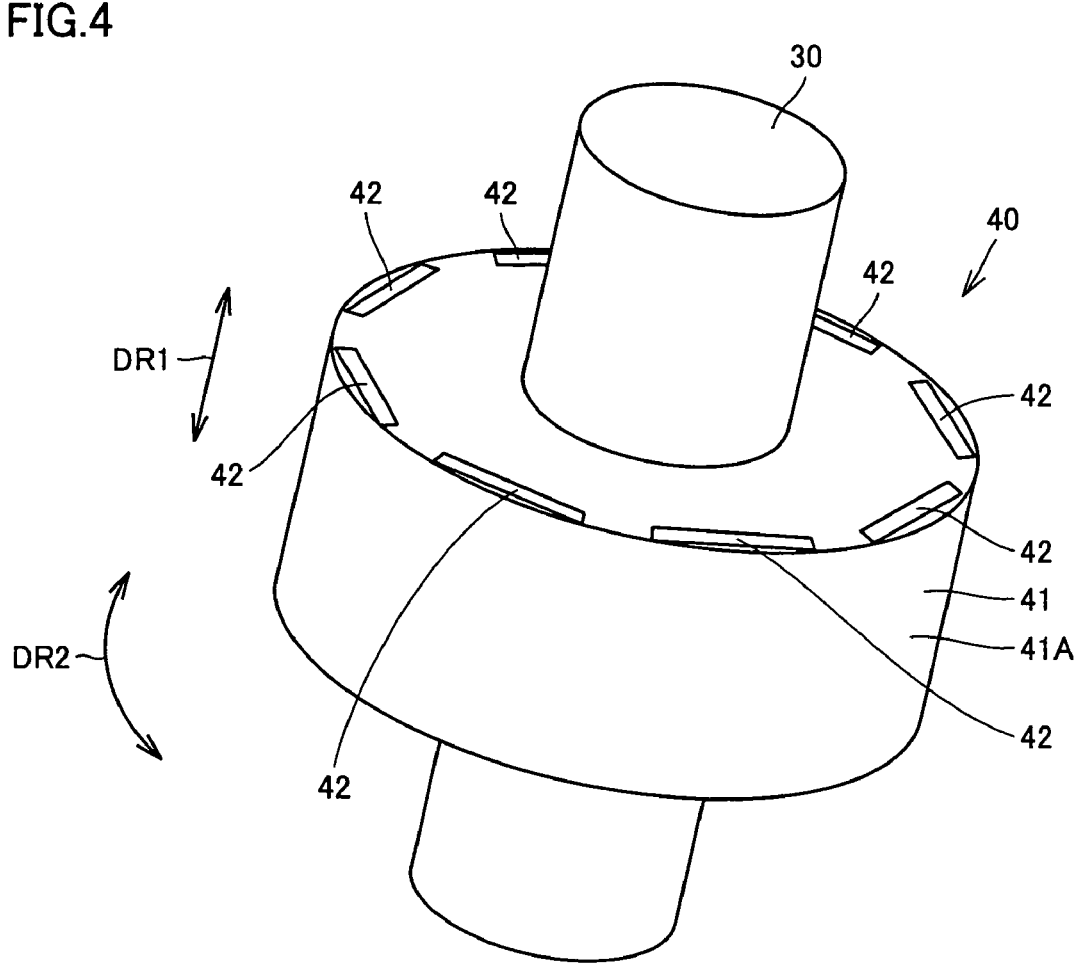
FIG. 4 is a perspective view of the rotor shown in FIG. 1.

FIG. 4 is a perspective view of rotor 40 shown in FIG. 1. Referring to FIG. 4, rotor core 41 of rotor 40 is substantially cylindrical in shape and has a cylinder surface 41A. Permanent magnets 42 are embedded in the rotational-axis direction DR1 in rotor core 41. Thus, rotor 40 is an IPM (Interior Permanent Magnet) rotor.

Figure 5:
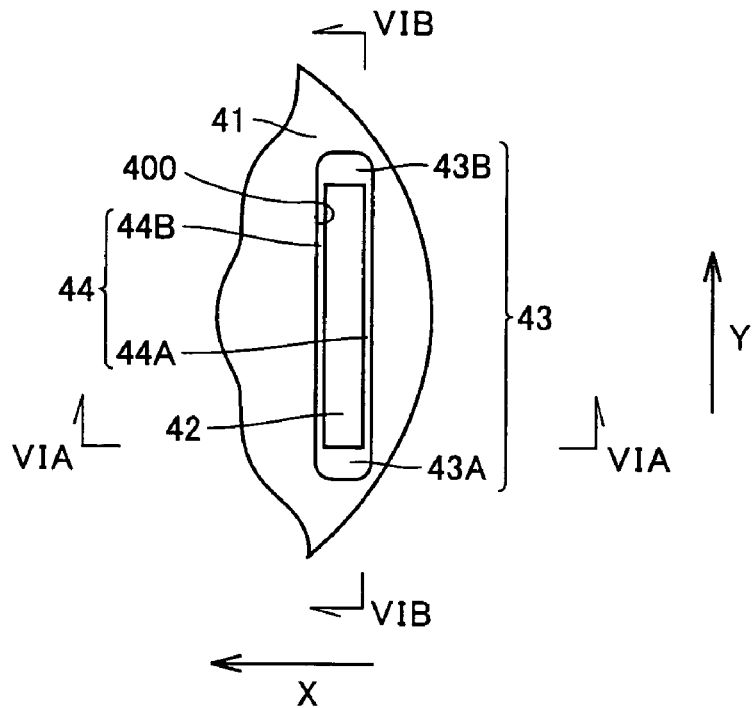
FIG. 5 is a plan view showing a magnet-inserted portion and therearound of the rotor shown in FIG. 1.

FIG. 5 is a plan view showing a magnet-inserted portion and therearound of the rotor. Referring to FIG. 5, in rotor core 41, a hole 400 for inserting a magnet therein is formed. Here, hole 400 is larger in size than permanent magnet 42 and a gap is formed between permanent magnet 42 and hole 400. The gap includes a first portion 43 and a second portion 44. Into the first and second portions 43, 44, a resin is injected as a filler to allow permanent magnet 42 to be embedded in rotor core 41. The first portion 43 includes a resin injection hole 43A and a resin discharge hole 43B formed at respective ends in the width direction (direction Y) of permanent magnet 42. The second portion 44 includes a radially outer gap 44A and a radially inner gap 44B formed respectively on the radially outside and inside of permanent magnet 42. In a process of embedding the magnet, the resin is injected from resin injection hole 43A and the resin is discharged from resin discharge hole 43B. In this process, the resin also spreads into the second portion 44 (radially outer gap 44A and radially inner gap 44B) that is narrower than the first portion 43. It is noted that, on a cross section with respect to the axial direction (the cross section shown in FIG. 5), the dimension in the direction X (first direction) of hole 400 and permanent magnet 42 each is relatively small and the dimension in the direction Y (second direction) orthogonal to the direction X of hole 400 and permanent magnet 42 each is relatively large.

Figure 6A:
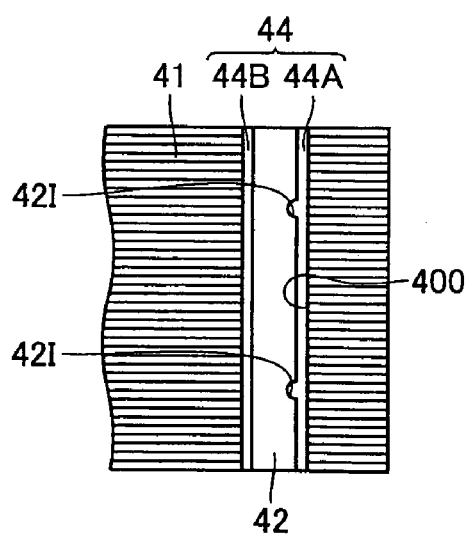
FIGS. 6A and 6B are each a longitudinal cross-sectional view showing the magnet-inserted portion and therearound of the rotor in the first embodiment of the present invention.
Figure 6B:
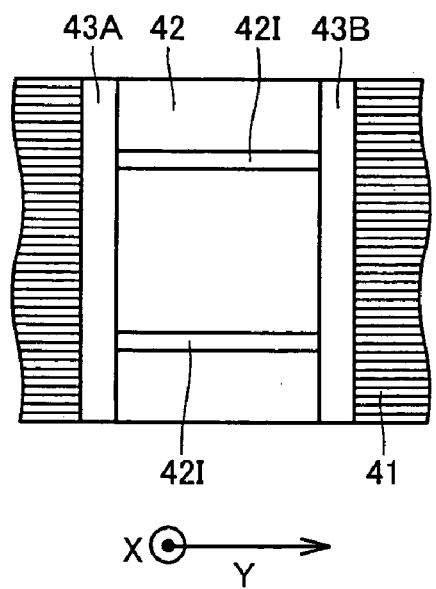

FIGS. 6A and 6B are each a longitudinal cross-sectional view showing the portion where permanent magnet 42 is inserted and therearound. Here, FIG. 6A shows the cross section along VIA-VIA in FIG. 5 and FIG. 6B shows the cross section along VIB-VIB in FIG. 5. Referring to FIGS. 6A and 6B, permanent magnet 42 has its side surface facing radially outer gap 44A and having a groove 42I formed therein as a spread-promoting portion that promotes the spread of a resin 45. Here, groove 42I is formed to extend in the direction Y (second direction) that is the long side direction of hole 400 and permanent magnet 42.

FIGS. 7A and 7B each show a state where the resin spreads on the radially outer side of the magnet. Here, FIG. 7A shows a state where the resin spreads in a rotor in an example for reference (hereinafter "reference example") and FIG. 7B shows a state where the resin spreads in the rotor in the present embodiment. In the resin injection process, the resin is injected from resin injection hole 43A in the direction indicated by the arrow 430A and the resin is discharged from resin discharge hole 43B in the direction indicated by the arrow 430B. Regarding the rotor in the reference example, as shown in FIG. 7A, no groove is formed in the magnet and resin 45 does not properly and sufficiently spread in radially outer gap 44A located between resin injection hole 43A and resin discharge hole 43B. In contrast, regarding the rotor in the present embodiment, as shown in FIG. 7B, since groove 42I is formed in the side surface of permanent magnet 42 along the flow of resin 45, the spread of resin 45 in radially outer gap 44A is promoted to allow resin 45 to uniformly fill a greater region of the gap. It is noted here that, even if there remains a part that is not completely filled with resin 45, as shown in FIG. 7B, this state is regarded as the one where substantially resin 45 uniformly fills the gap.

FIGS. 8A and 8B illustrate the force that is exerted by the resin on the radially outer side of the magnet and that presses the electromagnetic plates. Here, FIG. 8A illustrates the force regarding the rotor in the reference example and FIG. 8B illustrates the force regarding the rotor in the present embodiment. Referring to FIGS. 8A and 8B, centrifugal force 500 exerted on permanent magnet 42 while the rotor is rotating is transmitted through resin 45 to rotor core 41. Here, in the rotor of the reference example, the resin does not properly and sufficiently spread. Therefore, as shown in FIG. 8A, the force is exerted predominantly on a part of the electromagnetic plates of rotor core 41. In contrast, in the rotor of the present embodiment, as shown in FIG. 8B, the force exerted on rotor core 41 is uniformly distributed. Accordingly, generation of excessive stress in a part of the electromagnetic plates is prevented.

As seen from the above, groove 42I is formed in the radially outer side surface of the magnet and in the direction orthogonal to the direction in which resin injection hole 43A and resin discharge hole 43B extend (the direction of the rotor axis), so that the spread of the resin is promoted. As the spread of the resin in radially outer gap 44A is promoted, the centrifugal force transmitted from the permanent magnet through the resin portion is uniformly distributed.

Figure 9:
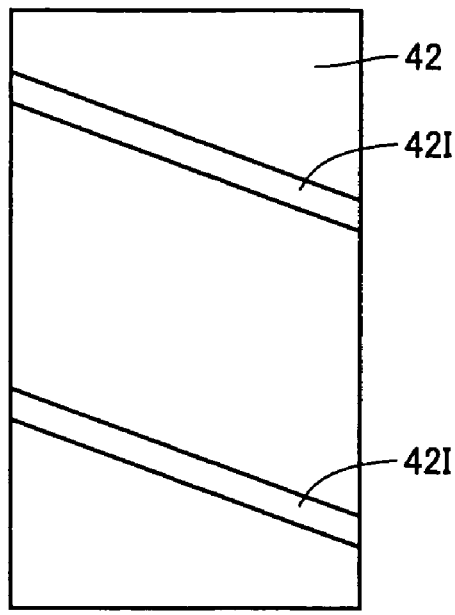
FIGS. 9 to 13 are each a side view showing a modification of the magnet provided in the rotor in the first embodiment of the present invention.
Figure 10:
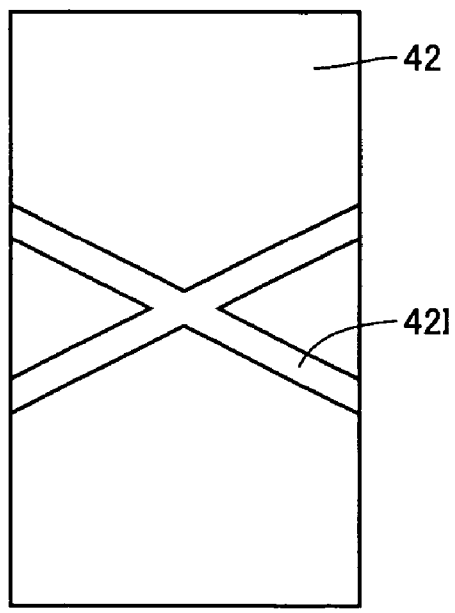
Figure 11:
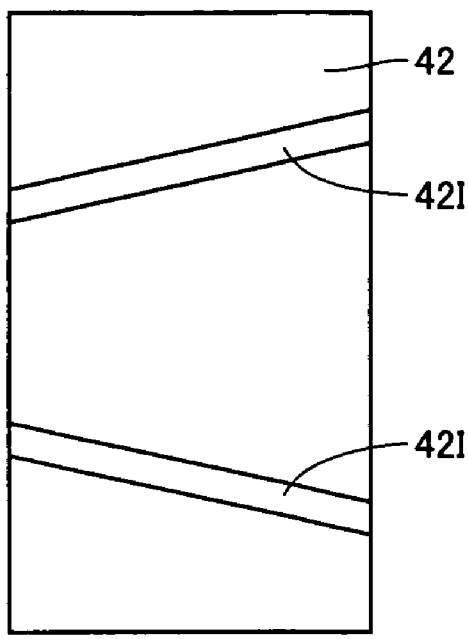
Figure 12:
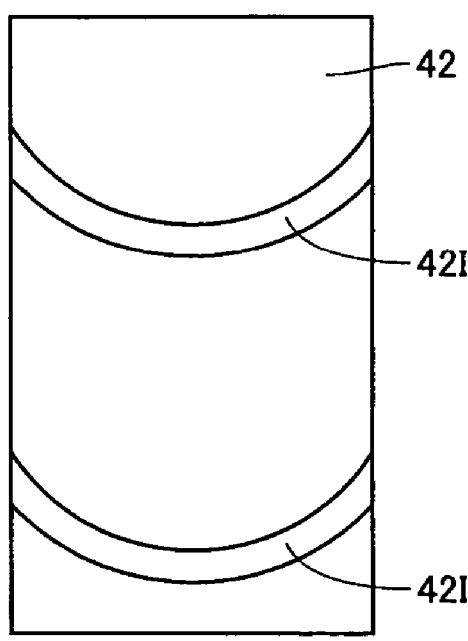
Figure 13:
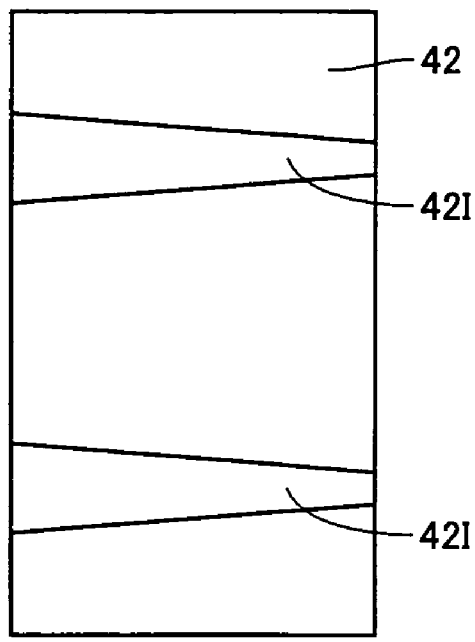

FIGS. 9 to 13 each show a modification of the groove formed in the magnet. The form of the groove made in the magnet is not limited to those shown in FIGS. 6A, 6B and 7B. For example, as shown in FIG. 9, groove 42I may extend obliquely or, as shown in FIG. 10, a plurality of grooves 42I may cross each other. Further, as shown in FIG. 11, a plurality of grooves 42I may be formed with a varying distance therebetween (the distance gradually increases/decreases). Furthermore, as shown in FIG. 12, groove 42I may be curved (the central portion curves downwardly). Moreover, as shown in FIG. 13, groove 42I may be formed with the width varied (the width gradually increases/decreases).

The details described above are summarized as follows. Rotor 40 in the present embodiment includes rotor core 41 that is fixedly provided on shaft 30 serving as a rotational shaft and that has hole 400, permanent magnet 42 inserted into hole 400, and resin 45 (filling portion) injected into a gap between a side surface of hole 400 and a side surface of permanent magnet 42, and the side surface of permanent magnet 42 has groove 42I formed therein as a spread-promoting portion for promoting spread of the injected resin 45.

Here, the portion into which resin 45 is injected includes the first portion 43 with a relatively large width and the second portion 44 with a relatively small width. Groove 42I is provided in the side surface of permanent magnet 42 that faces radially outer gap 44A of the second portion 44.

The "filling portion" injected into the gap between the side surface of the hole and the side surface of the permanent magnet is a fixing layer (adhesive layer) that fixes the rotor core and the permanent magnet to each other. Therefore, the "filler" that forms the "filling portion" is not limited to the aforementioned resin and thus the "filler" includes for example an adhesive and a mold material. Accordingly, while the present embodiment has been described in connection with the case where the resin is injected to embed the magnet in the rotor core, the effect as described above would be obtained as well in the case where an adhesive for example is used to embed the magnet in the rotor core. Further, while the present embodiment has been described in connection with the case where the spread of the resin in radially outer gap 44A is mainly promoted, the same idea is applicable to the case where the spread of resin in radially inner gap 44B is promoted.

Second Embodiment

Figure 14:
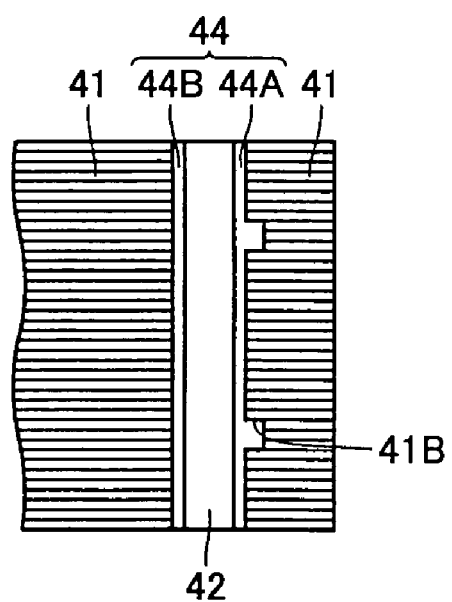
FIG. 14 is a longitudinal cross-sectional view showing a magnet-inserted portion and therearound of a rotor in a second embodiment of the present invention.

FIG. 14 is a longitudinal cross-sectional view showing a magnet-inserted portion and therearound of a rotor according to a second embodiment. Referring to FIG. 14, the rotor in the present embodiment is a modification of the rotor in the first embodiment and is characterized in that a groove 41B is formed as the resin-spread promoting portion in rotor core 41.

Groove 41B is formed as shown in FIG. 14 by providing a portion that is a part of the hole for inserting a magnet therein, that is in a few of the magnetic plates constituting rotor 41, and that is different in width from the remaining portion of the hole. Thus, a separate cutting process for forming groove 41B is unnecessary.

In the present embodiment, as described above, rotor core 41 has groove 41B formed therein as the spread-promoting portion that promotes the spread of the injected resin. With this structure as well, the effect similar to that of the first embodiment can be obtained.

Third Embodiment

Figure 15:
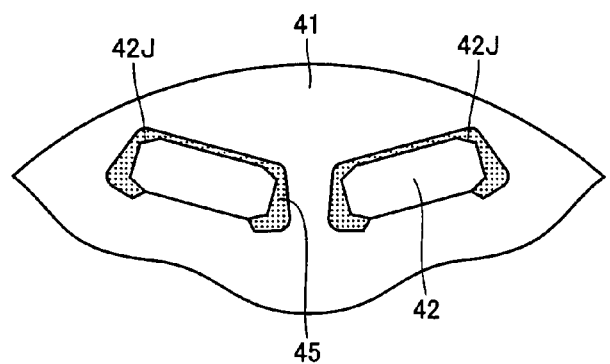
FIG. 15 is a plan view showing a magnet-inserted portion and therearound of a rotor in a third embodiment of the present invention.

FIG. 15 is a plan view showing a magnet-inserted portion and therearound of a rotor according to a third embodiment. Referring to FIG. 15, the rotor in the present embodiment is a modification of respective rotors of the first and second embodiments and is characterized in that a chamfered portion 42J is formed on permanent magnet 42 as a resin-spread promoting portion.

As chamfered portion 42J is formed, spread of resin 45 is facilitated in the gap with a relatively small width between the side surface of permanent magnet 42 and the inner peripheral surface of the magnet-inserted hole. With this structure as well, the effect similar to that of the first and second embodiments can be obtained.

Figure 16A:
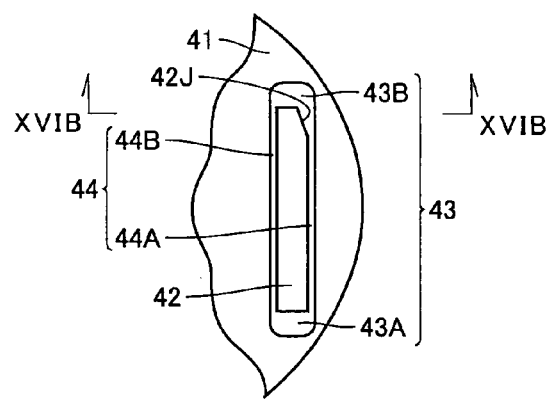
FIGS. 16A and 16B show a magnet-inserted portion and therearound of a modification of the rotor in the third embodiment of the present invention.
Figure 16B:
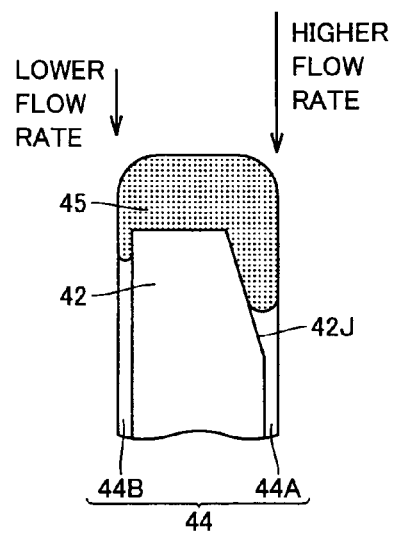

FIGS. 16A and 16B show a modification of the spread-promoting portion shown in FIG. 15. Here, FIG. 16A is a plan view of the rotor and FIG. 16B is a longitudinal cross-sectional view of the rotor (cross section along XVIB-XVIB in FIG. 16A). Referring to FIG. 16A, regarding this modification, chamfered portion 42J is provided on only the radially outer surface of permanent magnet 42. Accordingly, as shown in FIG. 16B, at the initial stage of a resin injection process, the flow rate of the resin into radially outer gap 44A is relatively high while the flow rate of the resin into radially inner gap 44B is relatively small. Accordingly, permanent magnet 42 is pressed radially inwardly of rotor core 41 to cause the width of radially outer gap 44A to increase, and thus the spread of the resin in radially outer gap 44A is promoted.

Fourth Embodiment

Figure 17:
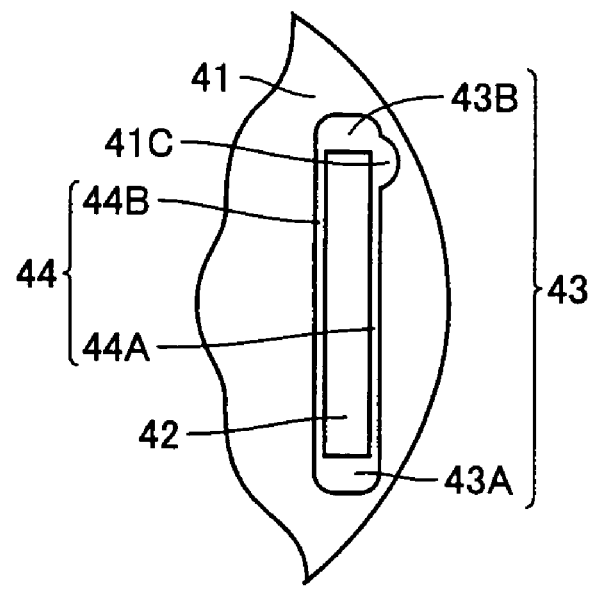
FIG. 17 is a plan view showing a magnet-inserted portion and therearound of a rotor in a fourth embodiment of the present invention.

FIG. 17 is a plan view showing a magnet-inserted portion and therearound of a rotor according to a fourth embodiment. Referring to FIG. 17, the rotor in the present embodiment is a modification of respective rotors of the first to third embodiments and is characterized in that a gap 41C (recessed portion) is formed in rotor core 41 as a resin-spread promoting portion. Gap 41C is preferably provided on the side of permanent magnet 42 that is located on the radially outer side of rotor core 41.

As gap 41C is formed, the flow rate of the resin into radially outer gap 44A is relatively high, and permanent magnet 42 is pressed radially inwardly of rotor core 41 to cause the width of radially outer gap 44A to increase. Accordingly, the spread of the resin in radially outer gap 44A is facilitated. With this structure as well, the effect similar to that of the first to third embodiments can be obtained.

Figure 18:
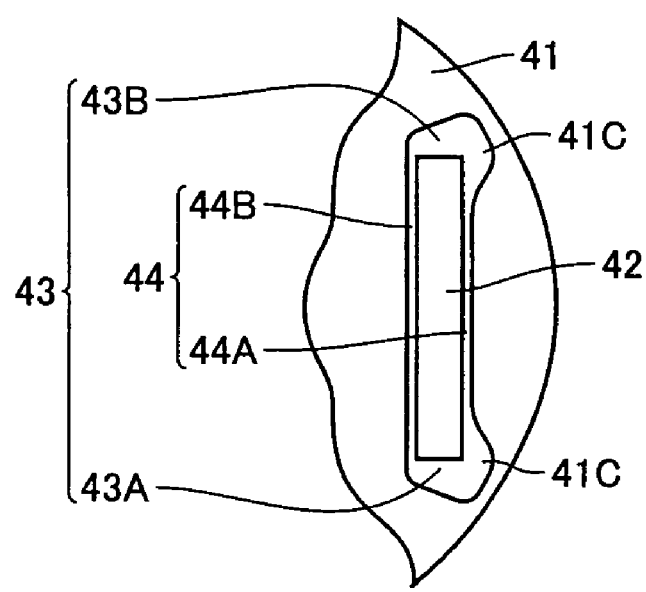
FIG. 18 is a plan view showing a magnet-inserted portion and therearound of a modification of the rotor in the fourth embodiment of the present invention.

FIG. 18 shows a modification of the spread-promoting portion shown in FIG. 17. Referring to FIG. 18, the present modification forms respective gaps 41C on both ends in the width direction of permanent magnet 42. Thus, the spread of the resin can more effectively be promoted.

Fifth Embodiment

Figure 19A:
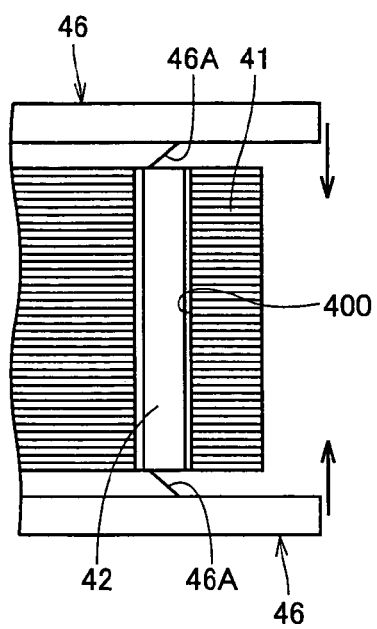
FIGS. 19A and 19B show a process of pressing a magnet radially inwardly of a rotor core in a method of manufacturing a rotor according to a fifth embodiment of the present invention.
Figure 19B:
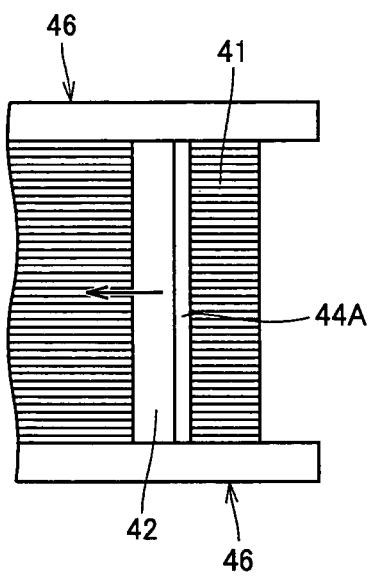

FIGS. 19A and 19B show a process of pressing the magnet radially inwardly of the rotor core in a method of manufacturing the rotor according to a fifth embodiment. As shown in FIGS. 19A and 19B, the method of manufacturing the rotor in the present embodiment includes the steps of inserting a magnet into hole 400 formed in rotor core 41, sandwiching rotor core 41 between press plates 46 each having a flexible fin 46A to press permanent magnet 42 inserted in hole 400 radially inwardly of rotor core 41 (FIGS. 19A, 19B), and thereafter injecting a resin into a gap between permanent magnet 42 and the wall surface of hole 400.

As described above, permanent magnet 42 inserted in hole 400 can be pressed radially inwardly of rotor core 41 to increase the width of radially outer gap 44A and thereby promote the spread of the resin in the radially outer gap. Accordingly, with the present embodiment as well, the effect similar to that of the first to fourth embodiments can also be obtained.

While the embodiments of the present invention have been described here, it is originally intended that some features of the above-described embodiment may appropriately be combined.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. A rotor comprising:
a rotor core fixedly provided on a rotational shaft and having a hole, the shaft extending along an axial direction thereof;
a magnet inserted into the hole; and
a filling portion injected into a gap between a side surface of the hole and a side surface of the magnet, wherein:
the filling portion is injected into the gap at a first hole on an end surface of the rotor core and discharged from a second hole on the end surface of the rotor core,
at least one of the magnet and the rotor core has a spread-promoting portion formed therein for promoting spread of the filling portion injected into the gap, and the spread-promoting portion comprises a plurality of elongated elements formed on the magnet, a direction in which the elements elongate being non-parallel to the axial direction of the shaft.

2. The rotor according to claim 1, wherein the spread-promoting portion promotes the spread of the filling portion on a side of magnet that is located on the radially outer side of the rotor core.

3. The rotor according to claim 1, wherein:
on a cross section with respect to the axial direction, the dimension in a first direction of the hole and magnet each is relatively small and the dimension in a second direction thereof that is orthogonal to the first direction is relatively large, and
the spread-promoting portion is formed to extend in the second direction.

4. The rotor according to claim 1, wherein:
the gap includes a first portion with a relatively large width and a second portion with a relatively small width, and
in a portion of the magnet or said rotor core that faces the second portion, the spread-promoting portion is provided.

5. The rotor according to claim 1, wherein the spread-promoting portion includes at least one of a groove, a chamfered portion and a recessed portion formed in the magnet or the rotor core.

6. A rotor comprising:
a rotor core fixedly provided on a rotational shaft and having a hole, the shaft extending along an axial direction thereof;
a magnet inserted into the hole; and
a filling portion injected into a gap between a side surface of the hole and a side surface of the magnet, wherein
the filling portion is injected into the gap at a first hole on an end surface of the rotor core and discharged from a second hole on the end surface of the rotor core,
at least one of said magnet and the rotor core has a plurality of grooves formed therein for promoting spread of the filling portion injected into the gap, and
the grooves are formed obliquely relative to the axial direction of the shaft, and/or the grooves are curved toward the axial direction of the shaft or a direction opposite to the axial direction.

7. A rotor comprising:
a rotor core fixedly provided on a rotational shaft and having a hole;
a magnet inserted into the hole, the magnet having a width; and
a filling portion injected into a gap between a side surface of the hole and a side surface of the magnet, wherein the magnet has a plurality of grooves formed therein for promoting spread of the filling portion injected into the gap, the grooves extending across the full width of the magnet,
wherein the filling portion is injected into the gap at a first hole on an end surface of the rotor core and discharged from a second hole on the end surface of the rotor core.

* * * * *